H. KAPPER.
BALL CAGE FOR BALL BEARINGS.
APPLICATION FILED FEB. 10, 1912.
1,026,749.
Patented May 21, 1912.
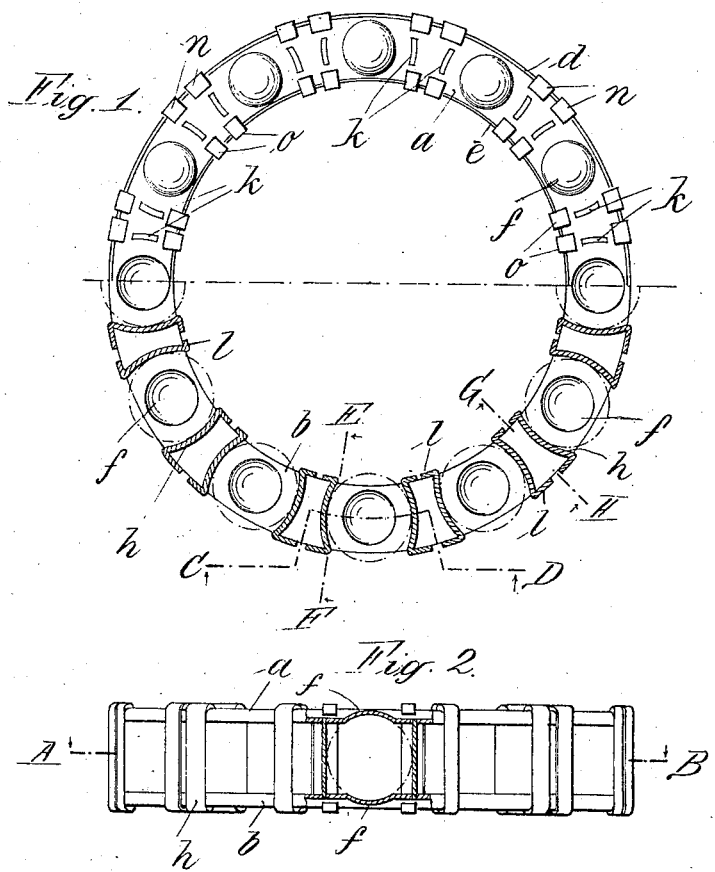
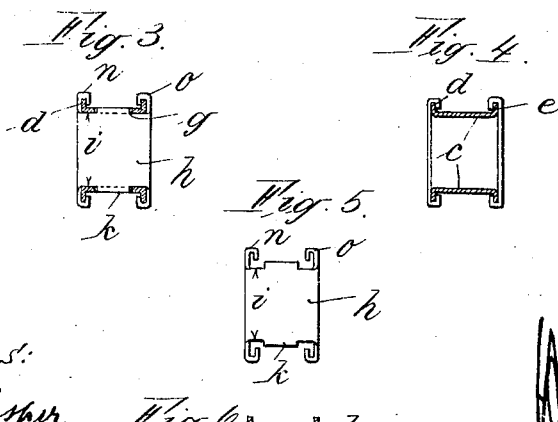

UNITED STATES PATENT OFFICE.

HERMANN KAPPER, OF TREPTOW, NEAR BERLIN, GERMANY, ASSIGNOR TO THE FIRM OF DEUTSCHE WAFFEN & MUNITIONSFABRIKEN, OF BERLIN, GERMANY.

BALL-CAGE FOR BALL-BEARINGS.

1,026,749.  Specification of Letters Patent.  Patented May 21, 1912.

Application filed February 10, 1912. Serial No. 676,838.

*To all whom it may concern:*

Be it known that I, HERMANN KAPPER, a subject of the German Emperor, and residing at Treptow, near Berlin, Germany, have invented certain new and useful Improvements in Ball-Cages for Ball-Bearings, of which the following is a specification.

My invention relates to those ball-cages of ball-bearings in which the upper and lower rings of the cage are connected by intermediate members. Various forms of such cages are well-known in themselves; some of them comprise distance pieces provided with pivot-like projections which are passed through holes in the rings and then upset. As the upper and lower rings are connected in such cages solely by the pivot-like projections of the distance pieces the well-known cages have the defect that the distance pieces are readily torn out of their seats and the bearing is exposed to the danger of being seriously injured.

A primary object of my invention is to obviate this defect.

To this end, my invention consists in the parts, improvements and combinations more particularly described hereinafter and pointed out in the claims.

One illustrative embodiment of my invention is represented by way of example in the accompanying drawing, wherein:—

Figure 1 is a top plan view, partly in horizontal section taken on the line A—B in Fig. 2, and Fig. 2 a front elevation, partly in vertical section taken on the bent line C—D in Fig. 1; Fig. 3 is a vertical section taken on the line E—F in Fig. 1, Fig. 4 a like view on the line G—H in Fig. 1, and Figs. 5 and 6 show a distance piece in elevation and cross-section, respectively.

Referring to the drawing, my improved ball-cage comprises an upper and a lower ring $a$ and $b$, respectively, each of which consists of a base part $c$ having outwardly-directed flange-like edges $e$ and $d$. The parts $c$ are provided with known recesses $f$ and with slots $g$ which receive the lugs $k$ provided at the top and bottom ends of the plates $i$ constituting the distance pieces $h$. In the illustrative embodiment the distance pieces $h$ are shown curved and each terminates on both sides in flanges $l$ having hooked ends $n$ and $o$ respectively engaging the edges $d$ and $e$.

Owing to the above described new mode of attaching the distance pieces $h$ by means of the bent flanges $l$ my improved cage has the advantage, as compared with cages known heretofore, that in view of the forces exercised by the balls being taken up, the lugs let into the base parts are for the most part relieved, so that the upper and lower rings $a$, $b$ are connected by means of the distance pieces $h$ in such a strong and secure manner that practical requirements are sufficiently met in every respect.

The cross-section of the distance pieces $h$ may, of course, be of any desired shape not impairing the motion of the balls, while the distance of the distance pieces one from another depends solely on the number of balls. When the number of balls is large and the cross-section of the distance pieces $h$ suitable, owing to the firm connection of the upper and lower rings one distance piece $h$ between each two balls is sufficient.

I claim:—

1. In a ball-cage, the combination with an upper and a lower ring each having a plurality of slots arranged one opposite another, of a plurality of distance pieces disposed between the rings, each of said distance pieces having lugs entering into the slots in the rings and having hooked portions engaging the edges of the rings.

2. In a ball-cage, the combination of an upper and a lower ring each having outwardly projecting edges and a plurality of slots one opposite another, and a plurality of laterally flanged distance pieces disposed between the rings, each of said distance pieces having two lugs entering into opposite slots in the rings, and the lateral flanges having hooked portions engaging the said edges of the rings.

In testimony whereof, I affix my signature in the presence of two witnesses.

HERMANN KAPPER.

Witnesses:
 WOLDEMAR HAUPT,
 HENRY HASPER.